(12) United States Patent
Henry

(10) Patent No.: US 8,047,029 B1
(45) Date of Patent: Nov. 1, 2011

(54) TIRE LOCKING ASSEMBLY

(76) Inventor: Trevor Henry, Newark, NJ (US)

( * ) Notice: Subject to any disclaimer, the term of this patent is extended or adjusted under 35 U.S.C. 154(b) by 116 days.

(21) Appl. No.: 12/587,219

(22) Filed: Oct. 5, 2009

(51) Int. Cl.
*B60R 25/00* (2006.01)
*B62H 5/14* (2006.01)

(52) U.S. Cl. ............... 70/226; 70/237; 70/233; 70/164; 70/14

(58) Field of Classification Search .............. 70/226, 70/237, 288, 289, 150, 225, 258, 38 A, 14, 70/233, 227, 259, 158, 159, 160, 161, 162, 70/163, 164
See application file for complete search history.

(56) References Cited

U.S. PATENT DOCUMENTS

| | | |
|---|---|---|
| D221,417 S | 8/1971 | Prichard |
| 5,134,868 A * | 8/1992 | Bethards .......................... 70/18 |
| 5,315,848 A * | 5/1994 | Beyer ................................ 70/18 |
| 5,372,018 A | 12/1994 | Smith |
| 5,375,442 A | 12/1994 | Hammer |
| D374,600 S | 10/1996 | Buttner |
| 6,360,571 B1 * | 3/2002 | O'Neal ........................... 70/226 |
| 6,434,980 B1 * | 8/2002 | Foster ............................. 70/19 |
| 6,662,607 B2 * | 12/2003 | O'Neal ........................... 70/226 |
| 6,796,154 B2 | 9/2004 | Gebow et al. |
| 7,278,520 B2 | 10/2007 | Kim |
| 7,594,415 B1 * | 9/2009 | Wu ................................. 70/18 |
| 2005/0252258 A1 | 11/2005 | Peacock |

* cited by examiner

*Primary Examiner* — Suzanne Barrett
*Assistant Examiner* — David Sosnowski

(57) ABSTRACT

A tire locking assembly includes a first elongated member and a second elongated member. Each of the first and second elongated members has a top end and a bottom end. The first and second elongated members each have an aperture extending therethrough positioned adjacent to an associated one of the top ends. A locking rod has a first end and a second end. The locking rod is extendable through the apertures in the first and second elongated member. The locking rod is extendable through a rim of a tire. A lock removably engages the locking rod and the second elongated member to secure the locking rod to the second elongate member.

4 Claims, 4 Drawing Sheets

TIRE LOCKING ASSEMBLY

BACKGROUND OF THE DISCLOSURE

Field of the Disclosure

The disclosure relates to tire securing devices and more particularly pertains to a new tire securing device for preventing the theft of a construction or utility type vehicle.

SUMMARY OF THE DISCLOSURE

An embodiment of the disclosure meets the needs presented above by generally comprising a first elongated member and a second elongated member. Each of the first and second elongated members has a top end and a bottom end. The first and second elongated members each have an aperture extending therethrough positioned adjacent to an associated one of the top ends. A locking rod has a first end and a second end. The locking rod is extendable through the apertures in the first and second elongated member. The locking rod is extendable through a rim of a tire. A lock removably engages the locking rod and the second elongated member to secure the locking rod to the second elongated member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects' other than those set forth above will become apparent when consideration is given to the following detailed description thereof. Such description makes reference to the annexed drawings wherein.

DESCRIPTION OF THE PREFERRED EMBODIMENT

Figure 1:
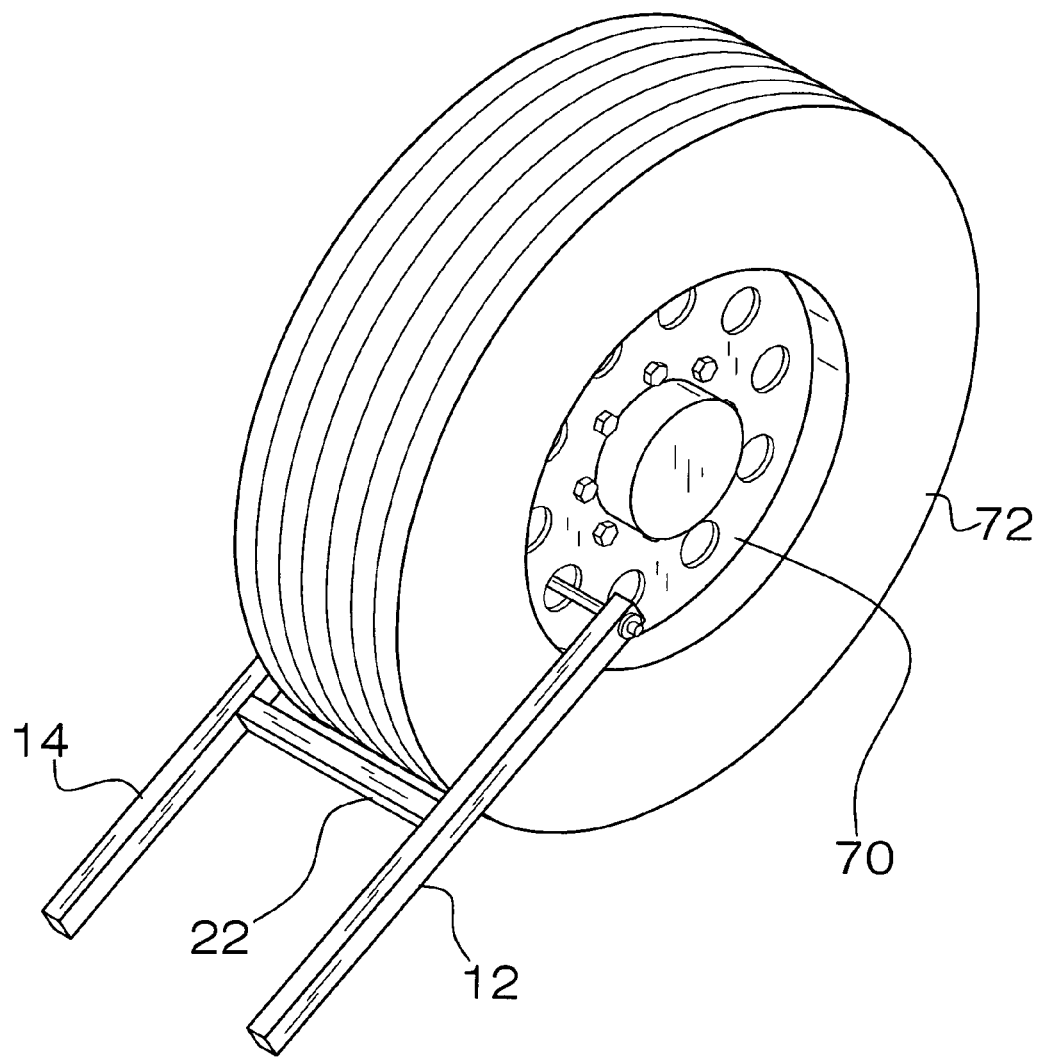
FIG. 1 is an in-use front perspective view of a tire locking assembly according to an embodiment of the disclosure.

With reference now to the drawings, and in particular to FIGS. 1 through 4 thereof, a new tire securing device embodying the principles and concepts of an embodiment of the disclosure and generally designated by the reference numeral 10 will be described.

As best illustrated in FIGS. 1 through 4, the tire locking assembly 10 generally comprises a first elongated member 12 and a second elongated member 14. Each of the first 12 and second 14 elongated members has a top end 16, 17 and a bottom end 18, 19. Each of the first 12 and second 14 elongated members has an aperture 20, 21 extending therethrough positioned adjacent to an associated one of the top ends 16, 17. Each of the elongated members 12, 14 is comprised of a metallic material. A brace 22 is attached to and extends between the first 12 and second 14 elongated members. The brace 22 is positioned between the top 16, 17 and bottom ends 18, 19. The brace 22 is also comprised of a metallic material. The brace 22 is fixedly and non-removably coupled to the first 12 and second 14 elongated members.

A locking rod 24 has a first end 26 and a second end 28. The locking rod 24 is extendable through the apertures 20, 21 in the first 12 and second 14 elongated members. A stop 30 is attached to the locking rod 24 adjacent to the first end 26 to inhibit the first end 26 from being pulled through the apertures 20, 21. The locking rod 24 is extendable through a rim 70 of a tire 72. The tire 72 will generally be the tire of a construction type vehicle such as earth movers, cranes, forklifts and the like which conventionally include rims 70 having apertures therein through which the locking rod 24 is extendable. The locking rod 24 has a pair of openings 32, 33 therein positioned adjacent to the second end 28. One of the openings 32 is alignable with a hole 34 extending through the second elongated member 14. The hole 34 is orientated perpendicular to and intersects the aperture 21 in the second elongated member 14.

A conventional lock 36 is provided which includes a pair of arms 38. Each of the arms 38 is removably extended through the openings 32, 33. One of the arms 38 extends through the hole 34 to secure the locking rod 24 to the second elongate elongated member 14.

Figure 2:
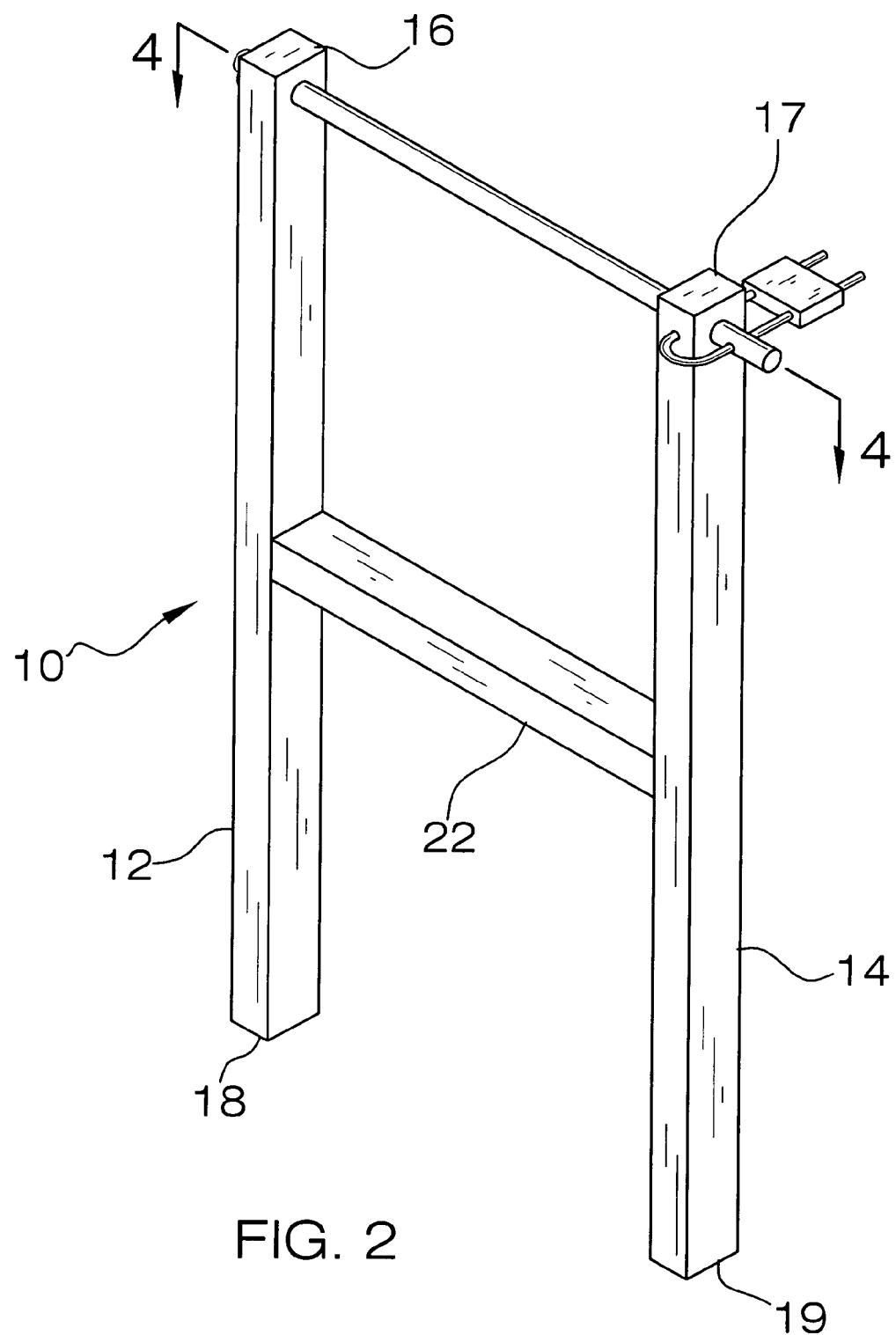
FIG. 2 is a rear perspective view of an embodiment of the disclosure.
Figure 3:
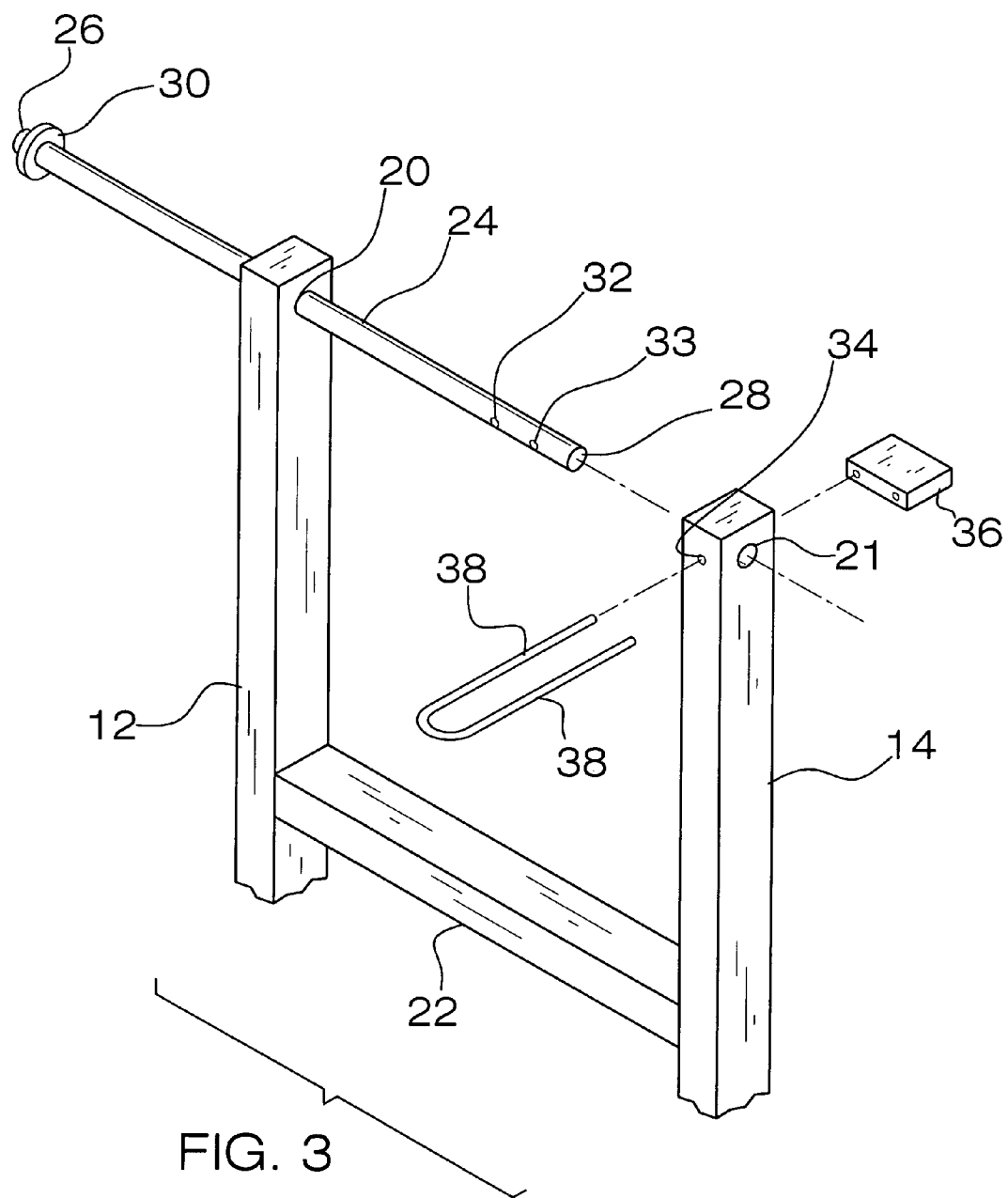
FIG. 3 is a broken rear perspective view of an embodiment of the disclosure.
Figure 4:
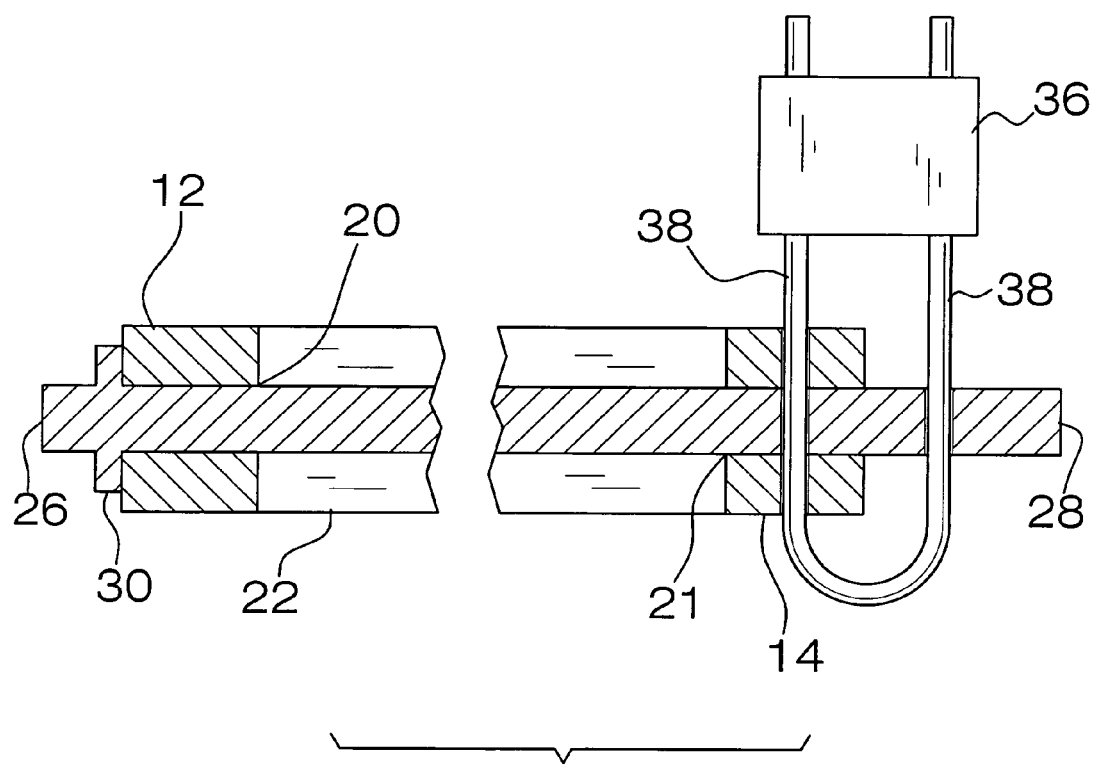
FIG. 4 is a broken cross-sectional view taken along line 4-4 of FIG. 2 of an embodiment of the disclosure.

In use, the first 12 and second 14 elongated members are positioned on either side of the tire 72 and the locking rod 24 extended through the rim 70 and the first 12 and second 14 elongated members. The lock 36 is then extended through the locking rod 24 and the second elongated member 14 as shown in FIG. 2. This will prevent the rotation of the tire 72 and will also inhibit the theft of the vehicle on which it is mounted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A tire locking assembly for engaging a tire of a construction vehicle, said assembly including:

a first elongated member and a second elongated member, each of said first and second elongated members having a top end and a bottom end, each of said first and second elongated members having an aperture extending therethrough positioned adjacent to an associated one of said top ends;

a locking rod having a first end and a second end, said locking rod being extendable through said apertures in said first and second elongated member, wherein said locking rod is extendable through a rim of the tire; and a lock removably engaging said locking rod and said second elongated member to secure said locking rod to said second elongate elongated member;

said locking rod has a pair of openings therein positioned adjacent to said second end, one of said openings being alignable with a hole extending through said second elongated member and orientated perpendicular to and intersecting said aperture in said second elongated member; and said lock including a pair of arms, each of said arms being removably extended through said openings, one of said arms extending through said hole to secure said locking rod to said second elongated member.

2. The said assembly according to claim 1, further including a stop being attached to said locking rod adjacent to said first end to inhibit said first end from being pulled through said apertures.

3. The said assembly according to claim 1, further including a brace being attached to and extending between said first and second elongated members, said brace being positioned between said top and bottom ends.

4. A tire locking assembly for engaging a tire of a construction vehicle, said assembly including:

- a first elongated member and a second elongated member, each of said first and second elongated members having a top end and a bottom end, each of said first and second elongated members having an aperture extending therethrough positioned adjacent to an associated one of said top ends, each of said elongated members being comprised of a metallic material;
- a locking rod having a first end and a second end, said locking rod being extendable through said apertures in said first and second elongated member, a stop being attached to said locking rod adjacent to said first end to inhibit said first end from being pulled through said apertures, said locking rod being extendable through a rim of the tire, said locking rod having a pair of openings therein positioned adjacent to said second end, one of said openings being alignable with a hole extending through said second elongated member and orientated perpendicular to and intersecting said aperture in said second elongated member;
- a lock including a pair of arms, each of said arms being removably extended through said openings, one of said arms extending through said hole to secure said locking rod to said second elongate elongated member; and
- a brace being attached to and extending between said first and second elongated members, said brace being positioned between said top and bottom ends.

\* \* \* \* \*